US009296943B2

(12) United States Patent
Ladva et al.

(10) Patent No.: US 9,296,943 B2
(45) Date of Patent: Mar. 29, 2016

(54) SUBTERRANEAN TREATMENT FLUID COMPOSITION AND METHOD OF TREATMENT

(71) Applicant: Schlumberger Technology Corporation, Sugar Land, TX (US)

(72) Inventors: Hemant K. J. Ladva, Missouri City, TX (US); Anthony Loiseau, Sugar Land, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 243 days.

(21) Appl. No.: 13/900,382

(22) Filed: May 22, 2013

(65) Prior Publication Data
US 2013/0312968 A1 Nov. 28, 2013

Related U.S. Application Data

(60) Provisional application No. 61/649,966, filed on May 22, 2012.

(51) Int. Cl.
*C09K 8/68* (2006.01)
*E21B 33/13* (2006.01)
*C09K 8/40* (2006.01)
*C09K 8/66* (2006.01)
*C09K 8/90* (2006.01)
*E21B 43/267* (2006.01)

(52) U.S. Cl.
CPC ... *C09K 8/68* (2013.01); *C09K 8/40* (2013.01); *C09K 8/66* (2013.01); *C09K 8/90* (2013.01); *E21B 33/13* (2013.01); *E21B 43/267* (2013.01)

(58) Field of Classification Search
CPC .................................. C09K 8/68; E21B 33/13
See application file for complete search history.

(56) References Cited

U.S. PATENT DOCUMENTS

| 4,335,788 | A | * | 6/1982 | Murphey et al. ............... 166/278 |
| 5,175,278 | A | | 12/1992 | Peik et al. |
| 5,518,996 | A | | 5/1996 | Maroy et al. |
| 6,110,271 | A | | 8/2000 | Skaggs et al. |
| 6,221,152 | B1 | | 4/2001 | Dial et al. |

(Continued)

FOREIGN PATENT DOCUMENTS

| WO | 0164897 | 9/2001 |
| WO | 03046116 | 6/2003 |

(Continued)

OTHER PUBLICATIONS

Banerjee et al. "Sorption of Water Vapor, Hydration, and Viscosity of Carboxymethylhydroxypropyl Guar, Diutan, and Xanthan Gums, and Their Molecular Association with and without Salts (NaCl, CaCl2, HCOOK, CH3COONa, (NH4) 2SO4 and MgSO4) in Aqueous Solution", Langmuir Article 2009, 25(19), pp. 11647-11656.

(Continued)

*Primary Examiner* — Paul Marcantoni
(74) *Attorney, Agent, or Firm* — Mathieu Vandermolen; Rachel E. Greene; Tim Currington

(57) ABSTRACT

A thickened composition comprising a polymer, a divalent ions source, water and cement is disclosed. Such composition enables fluid loss reduction and higher gel strength. This may be useful for treating a well for example as a fluid spacer or a scavenger; this may also be used a hydraulic fracturing fluid.

11 Claims, 6 Drawing Sheets

(56) References Cited

U.S. PATENT DOCUMENTS

| | | | |
|---|---|---|---|
| 6,815,399 B1* | 11/2004 | Johnson et al. | 507/211 |
| 7,494,957 B2 | 2/2009 | Pena et al. | |
| 7,584,791 B2 | 9/2009 | Robb et al. | |
| 7,784,541 B2 | 8/2010 | Hartman et al. | |
| 7,789,146 B2 | 9/2010 | Panga et al. | |
| 7,833,947 B1 | 11/2010 | Kubala | |
| 7,954,549 B2 | 6/2011 | Lende et al. | |
| 8,002,049 B2 | 8/2011 | Keese et al. | |
| 8,008,234 B2 | 8/2011 | Panga et al. | |
| 8,119,574 B2 | 2/2012 | Panga et al. | |
| 8,132,623 B2 | 3/2012 | Allin et al. | |
| 8,210,249 B2 | 7/2012 | Panga et al. | |
| 8,529,694 B2* | 9/2013 | Herschke et al. | 106/823 |
| 2004/0083926 A1* | 5/2004 | Mitkova et al. | 106/38.27 |
| 2005/0241540 A1* | 11/2005 | Hohn et al. | 106/805 |
| 2005/0241541 A1* | 11/2005 | Hohn et al. | 106/805 |
| 2005/0241542 A1* | 11/2005 | Hagen et al. | 106/805 |
| 2005/0241543 A1* | 11/2005 | Hagen et al. | 106/805 |
| 2005/0261138 A1 | 11/2005 | Robb et al. | |
| 2006/0166837 A1 | 7/2006 | Lin et al. | |
| 2007/0215355 A1 | 9/2007 | Shapovalov et al. | |
| 2008/0035338 A1 | 2/2008 | Pauls et al. | |
| 2008/0156225 A1 | 7/2008 | Bury | |
| 2008/0194427 A1 | 8/2008 | Welton et al. | |
| 2008/0194428 A1 | 8/2008 | Welton et al. | |
| 2008/0194430 A1 | 8/2008 | Welton et al. | |
| 2008/0289538 A1 | 11/2008 | Friedrich et al. | |
| 2010/0300688 A1 | 12/2010 | Panga et al. | |
| 2012/0000641 A1 | 1/2012 | Panga et al. | |
| 2012/0073813 A1 | 3/2012 | Zamora et al. | |
| 2012/0111563 A1 | 5/2012 | Abad et al. | |
| 2012/0132421 A1 | 5/2012 | Loiseau et al. | |
| 2012/0138296 A1 | 6/2012 | Panga et al. | |
| 2012/0305245 A1 | 12/2012 | Loiseau et al. | |
| 2012/0305254 A1 | 12/2012 | Chen et al. | |
| 2013/0161003 A1* | 6/2013 | Makarychev-Mikhailov et al. | 166/280.1 |

FOREIGN PATENT DOCUMENTS

| | | |
|---|---|---|
| WO | 2007053612 A2 | 5/2007 |
| WO | 2012054456 | 4/2012 |

OTHER PUBLICATIONS

Zhang et al. "Early Hydration and Setting of Oil Well Cement" Cement and Concrete Research 40 (2010) pp. 1023-1033.

Sinclair et al. "High strength cement pastes", Journal of Material Science 20 (1985) pp. 2846-2852, Oxford, UK.

Peschard et al. "Effect of polysaccharides on the hydration of cement paste at early ages", Cement and Concrete Research 34 (2004) pp. 2153-2158, France.

Shampine et al., U.S. Appl. No. 13/415,025, "System and Method for Delivering Treatment Fluid", filed Mar. 8, 2012.

Potapenko et al., WO PCT Application No. PCT/RU2011/000971, "Well Treatment With High Solids Content Fluids", filed Dec. 9, 2011.

\* cited by examiner

SUBTERRANEAN TREATMENT FLUID COMPOSITION AND METHOD OF TREATMENT

RELATED APPLICATION DATA

The current application claims the benefit of U.S. provisional application Ser. No. 61/649,966, filed on May 22, 2012, the entire content of which is incorporated herein by reference.

BACKGROUND

The statements in this section merely provide background information related to the present disclosure and may not constitute prior art.

This application relates in general to well treatment such as stimulation of wells penetrating subterranean formations, and more specifically to fracture stimulation by injection of fluid into a fracture to form regions of low resistance to flow through the fracture for the production of hydrocarbons.

Various methods are known for fracturing a subterranean formation to enhance the production of fluids therefrom. In the typical application, a pressurized fracturing fluid hydraulically creates and propagates a fracture. The fracturing fluid carries proppant particulates into the extending fracture. When the fracturing fluid is removed, the fracture does not completely close from the loss of hydraulic pressure; instead, the fracture remains propped open by the packed proppant, allowing fluids to flow from the formation through the proppant pack to the production wellbore.

SUMMARY

Embodiments relate to methods, comprising adding cement and a source of divalent ions to a treatment fluid containing a polymer and water thereby increasing the viscosity of the treatment fluid.

Embodiments pertain to compositions comprising a polymer, a source of divalent ions, water and cement.

Further embodiments aim at methods of treating a well, comprising adding cement and a source of divalent ions to a treatment fluid containing a polymer and water to form a thickened composition; then, pumping the thickened composition down the well.

BRIEF DESCRIPTION OF THE DRAWINGS

These and other features and advantages will be better understood by reference to the following detailed description when considered in conjunction with the accompanying drawings.

DETAILED DESCRIPTION OF SOME ILLUSTRATIVE EMBODIMENTS

Figure 1:
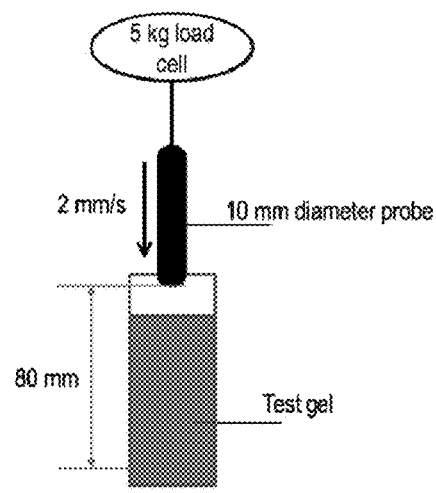
FIG. 1 shows the experimental setup used to measure the force exerted on a probe inserted into a gel.

For the purposes of promoting an understanding of the principles of the disclosure, reference will now be made to some illustrative embodiments of the current application. Like reference numerals used herein refer to like parts in the various drawings. Reference numerals without suffixed letters refer to the part(s) in general; reference numerals with suffixed letters refer to a specific one of the parts.

As used herein, "embodiments" refers to non-limiting examples of the application disclosed herein, whether claimed or not, which may be employed or present alone or in any combination or permutation with one or more other embodiments. Each embodiment disclosed herein should be regarded both as an added feature to be used with one or more other embodiments, as well as an alternative to be used separately or in lieu of one or more other embodiments. It should be understood that no limitation of the scope of the claimed subject matter is thereby intended, any alterations and further modifications in the illustrated embodiments, and any further applications of the principles of the application as illustrated therein as would normally occur to one skilled in the art to which the disclosure relates are contemplated herein.

Moreover, the schematic illustrations and descriptions provided herein are understood to be examples only, and components and operations may be combined or divided, and added or removed, as well as re-ordered in whole or part, unless stated explicitly to the contrary herein. Certain operations illustrated may be implemented by a computer executing a computer program product on a computer readable medium, where the computer program product comprises instructions causing the computer to execute one or more of the operations, or to issue commands to other devices to execute one or more of the operations.

At the outset, it should be noted that in the development of any such actual embodiment, numerous implementation-specific decisions must be made to achieve the developer's specific goals, such as compliance with system related and business related constraints, which will vary from one implementation to another. Moreover, it will be appreciated that such a development effort might be complex and time consuming but would nevertheless be a routine undertaking for those of ordinary skill in the art having the benefit of this disclosure. In addition, the composition used/disclosed herein can also comprise some components other than those cited. In the summary of the invention and this detailed description, each numerical value should be read once as modified by the term "about" (unless already expressly so modified), and then read again as not so modified unless otherwise indicated in context. Also, in the summary of the invention and this detailed description, it should be understood that a concentration range listed or described as being useful, suitable, or the like, is intended that any and every concentration within the range, including the end points, is to be considered as having been stated. For example, "a range of from 1 to 10" is to be read as indicating each and every possible number along the continuum between about 1 and about 10. Thus, even if specific data points within the range, or even no data points within the range, are explicitly identified or refer to only a few specific, it is to be understood that inventors appreciate and understand that any and all data points within the range are to be considered to have been specified, and that inventors possessed knowledge of the entire range and all points within the range.

As used herein, the terms "treatment fluid" or "wellbore treatment fluid" are inclusive of "fracturing fluid" or "treatment slurry" and should be understood broadly. These may be or include a liquid, a solid, a gas, and combinations thereof, as will be appreciated by those skilled in the art. A treatment fluid may take the form of a solution, an emulsion, slurry, or any other form as will be appreciated by those skilled in the art.

As used herein, "slurry" refers to an optionally flowable mixture of particles dispersed in a fluid carrier. The terms "flowable" or "pumpable" or "mixable" are used interchangeably herein and refer to a fluid or slurry that has either a yield stress or low-shear ($5.11\ s^{-1}$) viscosity less than 1000 Pa and a dynamic apparent viscosity of less than 10 Pa·s (10,000 cP) at a shear rate $170\ s^{-1}$, where yield stress, low-shear viscosity and dynamic apparent viscosity are measured at a temperature of 25° C. unless another temperature is specified explicitly or in context of use.

In some embodiments, the treatment fluid may include a continuous fluid phase, also referred to as an external phase, and a discontinuous phase(s), also referred to as an internal phase(s), which may be a fluid (liquid or gas) in the case of an emulsion, foam or energized fluid, or which may be a solid in the case of a slurry. The continuous fluid phase may be any matter that is substantially continuous under a given condition. Examples of the continuous fluid phase include, but are not limited to, water, hydrocarbon, gas, liquefied gas, etc., which may include solutes, e.g. the fluid phase may be a brine, and/or may include a brine or other solution(s). In some embodiments, the fluid phase(s) may optionally include a viscosifying and/or yield point agent and/or a portion of the total amount of viscosifying and/or yield point agent present. The slurry may also be an energized fluid (e.g., an $N_2$ or $CO_2$ based foam), a viscoelastic surfactant (VES) viscosified fluid, and an oil-based fluid including a gelled, foamed, or otherwise viscosified oil.

The discontinuous phase if present in the treatment fluid may be any particles (including fluid droplets) that are suspended or otherwise dispersed in the continuous phase in a disjointed manner. In this respect, the discontinuous phase can also be referred to, collectively, as "particle" or "particulate" which may be used interchangeably. As used herein, the term "particle" should be construed broadly. For example, in some embodiments, the particle(s) of the current application are solid such as proppant, sands, ceramics, crystals, salts, etc.; however, in some other embodiments, the particle(s) can be liquid, gas, foam, emulsified droplets, etc. Moreover, in some embodiments, the particle(s) of the current application are substantially stable and do not change shape or form over an extended period of time, temperature, or pressure; in some other embodiments, the particle(s) of the current application are degradable, dissolvable, deformable, meltable, sublimeable, or otherwise capable of being changed in shape, state, or structure.

The particles in the slurry in various embodiments may be multimodal. As used herein multimodal refers to a plurality of particle sizes or modes which each has a distinct size or particle size distribution, e.g., proppant and fines. As used herein, the terms distinct particle sizes, distinct particle size distribution, or multi-modes or multimodal, mean that each of the plurality of particles has a unique volume-averaged particle size distribution (PSD) mode. That is, statistically, the particle size distributions of different particles appear as distinct peaks (or "modes") in a continuous probability distribution function. For example, a mixture of two particles having normal distribution of particle sizes with similar variability is considered a bimodal particle mixture if their respective means differ by more than the sum of their respective standard deviations, and/or if their respective means differ by a statistically significant amount. In certain embodiments, the particles contain a bimodal mixture of two particles; in certain other embodiments, the particles contain a trimodal mixture of three particles; in certain additional embodiments, the particles contain a tetramodal mixture of four particles; in certain further embodiments, the particles contain a pentamodal mixture of five particles, and so on. Representative references disclosing multimodal particle mixtures include U.S. Pat. No. 5,518,996, U.S. Pat. No. 7,784,541, U.S. Pat. No. 7,789,146, U.S. Pat. No. 8,008,234, U.S. Pat. No. 8,119,574, U.S. Pat. No. 8,210,249, US 2010/0300688, US 2012/0000641, US 2012/0138296, US 2012/0132421, US 2012/0111563, WO 2012/054456, US 2012/0305245, US 2012/0305254, US 2012/0132421, PCT/RU2011/000971 and U.S. Ser. No. 13/415,025, each of which are hereby incorporated herein by reference.

In some embodiments, there is disclosed a method comprising adding cement and a source of divalent ions to a treatment fluid containing a polymer; thereby increasing the viscosity of the treatment fluid. The polymer may be a polysaccharide such as gellan gum and gellan gum derivatives, diutan gum and diutan gum derivatives, ramsan gum and ramsan gum derivatives. The divalent source may be calcium, magnesium, and other divalent ions. In some embodiments, the divalent source is calcium and the source of calcium may be a calcium containing inorganic material selected from the group consisting of calcium oxide, calcium hydroxide, or calcium carbonate, and mixtures thereof. The source of cement may be a Portland cement, either hydrated or unhydrated. Other types of cement such as calcium-aluminate cement or Sorel cements may also be used in the current application.

In some embodiments of the current application, a small amount of cement is utilized in conjunction with calcium carbonate and a bio-polymer to produce significant improvement in fluid properties. In particular the gel strength of the fluid may be enhanced. The fluid composition may also include different types of additives including sand, proppants, fibers and the like. Further polymers may also be present such as guar gum, xanthan, polyacrylamide, karaya, gum tragacanth, gum ghatti, gum, acacia, gum konjak, shariz, locus, psyllium, tamarind, gum tara, carrageenin, gum kauri, hydroxypropyl guar, hydroxyethyl guar, carboxymethyl hydroxypropyl guar and carboxymethyl hydroxy-ethyl guar. The concentration of cement may be from 0.1% to 10% by weight of composition; or it may be from 0.1 to 5%, or it may be from 0.2 to 3%.

The proppant, when present, can be naturally occurring materials, such as sand grains. The proppant, may also be man-made or specially engineered, such as coated (including resin-coated) sand, modulus of various nuts, high-strength ceramic materials like sintered bauxite, etc. In some embodiments, the proppant of the current application, when present, has a density greater than 2.45 g/mL, e.g., 2.5-2.8 g/mL, such as sand, ceramic, sintered bauxite or resin coated proppant. In some embodiments, the proppant of the current application, when present, has a density less than or equal to 2.45 g/mL, such as less than about 1.60 g/mL, less than about 1.50 g/mL, less than about 1.40 g/mL, less than about 1.30 g/mL, less than about 1.20 g/mL, less than 1.10 g/mL, or less than 1.00 g/mL, such as light/ultralight proppant from various manufacturers, e.g., hollow proppant.

In some embodiments, the current application discloses a composition for treating a subterranean formation, said composition comprising a polysaccharide, a source of calcium, and a source of cement. The polysaccharide may be a heteropolysaccharide. In some embodiments, the polysaccharide is selected from a group consisting of gellan gum and gellan gum derivatives, diutan gum and diutan gum derivatives, ramsan gum and ramsan gum derivatives. Specifically, the polysaccharide may be a diutan gum having a tetrasaccharide repeating unit in the polymer backbone. The concentration of polymer may be from 0.02% to 1.5% by weight of composition; or it may be from 0.05 to 1%.

In some embodiments, the source of calcium is a calcium containing inorganic material, such as calcium oxide, calcium hydroxide and calcium carbonate. The concentration of calcium may be from 4% to 40% by weight of composition; or it may be from 5% to 30%.

The combination of cement, polymer and calcium may be present in an aqueous fluid. Any type of water may be used in the present fluid such as sea water, buffered water or water produced from a well.

The composition may further comprise particulates of silicates, sand, or proppants. The composition may further comprise heavy brines such calcium bromide, zinc bromide, potassium chloride, sodium chloride, or magnesium chloride. In some embodiment, the composition may further comprise a weighting agent such as barite or hematite; the composition may also comprise clay.

Without being bound by any theory, it is believed that the addition of low cement concentration together with calcium carbonate have a viscosifying effect on the polymer, enabling the fluid to suspend particulate solids with varying densities including proppants. The viscosity and gel strength of the composition may be increased by adding small amounts of cement before or after the addition of calcium containing material.

The kinetics of gel formation of the composition may be controlled by the size of the Portland cement and calcium containing inorganic solids and/or by encapsulation. Using a low amount of cement and divalent ions enables a reduction of polymer concentration is the treatment fluid while achieving the same viscosity. Moreover, the composition of the current application may further enhance the conductivity of the treatment fluid compared to conventional treatment fluid, such as high solid content formulation. The composition of the current application may also provide beneficial environmental impact due to the usage of less material volume and polymer concentration compared with conventional treatment fluid.

In further embodiments, the composition of the current application may be used to strengthen pillars formed by the treatment fluid such as when using a high solid content fluid. An overflush fluid comprising cement filtrate or formulated synthetically may be used to create efficient channels into the high solids content fluid placed inside the fracture.

Cement may be used either as cured cement particulates or unhydrated cement particles or encapsulated cement particulates to create localized gelled areas within the high solids content fluid placed inside a fracture. Accordingly, cement can be used in high solids content formulation to promote segregation and/or channelization. Cement may also be used in the formulation to create controlled rate of gelation and channelization.

A high solid content fluid may be a fluid as defined in U.S. Pat. No. 7,833,947, incorporated herein by reference in its entirety.

In some embodiments, the composition may also be used as a spacer fluid between treatment fluid and overflush fluid or any other sequential fluid to minimize mixing down the pipe. Such composition may also be used as a scavenger.

Embodiments of the current application may be used to create gels of specific strengths, isolate zones, conduct cleanout operation by coiled tubing, create gels such that any fluids containing solid particles may be suspended, plug formation, create temporary plugs, conduct water shut off applications.

In some embodiments, fibers may be added for example to improve lost circulation properties.

The following examples show development of varying gel strengths based mainly on three additives including a polymer, cement and calcium carbonate. The amount of cement required is relatively small that has pronounced effect on the gel strength. The composition is not limited to the three components mentioned here but may also include other polymeric and particulate additives and their combinations.

EXAMPLES

Example 1

Two gels were formed in order to compare qualitatively the gel formed without cement and with 5 wt % cement added to a mixture of calcium carbonate and a diutan polymer. The Diutan polymer concentration was 30 ppt (pounds per thousand) in water and the calcium carbonate concentration was 80 grams added to 100 ml polymer solution. In the presence of cement a much stronger and cohesive gel was formed compared with a formulation without cement where the gel was exhibiting syneresis.

Example 2

Table 1 shows the full formulation of the base fluid used in the experiment which includes 11.39 wt % of calcium carbonate and, 0.036 wt % of a Diutan polymer and 0 g of cement. This formulation was modified in two ways as given in Table 1 to demonstrate that a stable rheology may still be maintained by including cement in the formulation and reducing the calcium carbonate and polymer concentration. The first modification reduced the amount of small particle size calcium carbonate (2 microns) and Diutan, and included small amount of cement. The second modification used reduced amount of calcium carbonate of larger particles size (35 microns), reduced amount of Diutan and small amount of cement.

TABLE 1

Formulation of the base fluid and its two modified versions
Diutan was GEOVIS ® XT from Kelco Oil field Group. The dispersant was Sodium-Polynaphtalene Sulfonate from BASF Corp.

|  | Base Fluid Wt % | Modified Fluid No. 1 Wt % | Modified Fluid No. 2 Wt % |
|---|---|---|---|
| Proppant sand (40/70 mesh) | 51.72 | 55.83 | 55.87 |
| Sand (100 Mesh) | 8.75 | 9.45 | 9.44 |
| Silica flour | 7.95 | 8.59 | 8.59 |
| $CaCO_3$ | 11.39 | 4.39 (2 μm) | 4.39 (35 μm) |
| Diutan | 0.036 | 0.026 | 0.026 |
| Dispersant | 0.097 | 0.105 | 0.105 |
| Portland Class G Cement | 0 | 0.081 | 0.026 |
| Water | 19.94 | 21.52 | 21.64 |
| Solid Volume Fraction (%) | 60 | 54.7 | 54.7 |
| Specific Gravity | 2 | 1.85 | 1.85 |
| PPA | 14.1 | 15.5 | 15.5 |

The rheology of the second modified fluid measured using Fann 35 viscometer is given in Table 2. Both modified formulations resulted in stable formulations over a period of at least 5 days at room temperature and gave rheology that was similar to the base fluid.

TABLE 2

Fann rheology (Rotor 1 Bob 5) at room temperature of the two modified versions of the base fluid

| | Base Fluid | | Modification No. 1 | | Modification No. 2 | |
|---|---|---|---|---|---|---|
| RPM | Dial readings after mixing | Dial Readings 15 min later | Dial readings after mixing | Dial Readings 15 min later | Dial readings after mixing | Dial Readings 15 min later |
| 300 | >300 | >300 | 181 | 186 | 178 | 180 |
| 200 | 238 | 239 | 140 | 144 | 139 | 140 |
| 100 | 144 | 145 | 90 | 92.5 | 90 | 90.5 |
| 60 | 103 | 104 | 69 | 71.5 | 70 | 71 |
| 30 | 71 | 78 | 49 | 51.5 | 50 | 51 |
| 20 | 58 | 65 | 41.5 | 44 | 42.5 | 43 |
| 10 | 44 | 49 | 32 | 34 | 32.5 | 33 |
| 6 | 36 | 40 | 27 | 28.5 | 28 | 27.5 |
| 3 | 30 | 33 | 21.5 | 23.5 | 22.5 | 22.5 |

Example 3

FIG. 1 shows the experimental setup used to measure the force exerted on a cylindrical probe driven at a constant rate of 2 mm/s into a gel. A texture analyzer, TA HD plus (From Texture Technology Corp.) was used to characterize the gel quality and acquire force with distance driven into the gel data.

Figure 2:
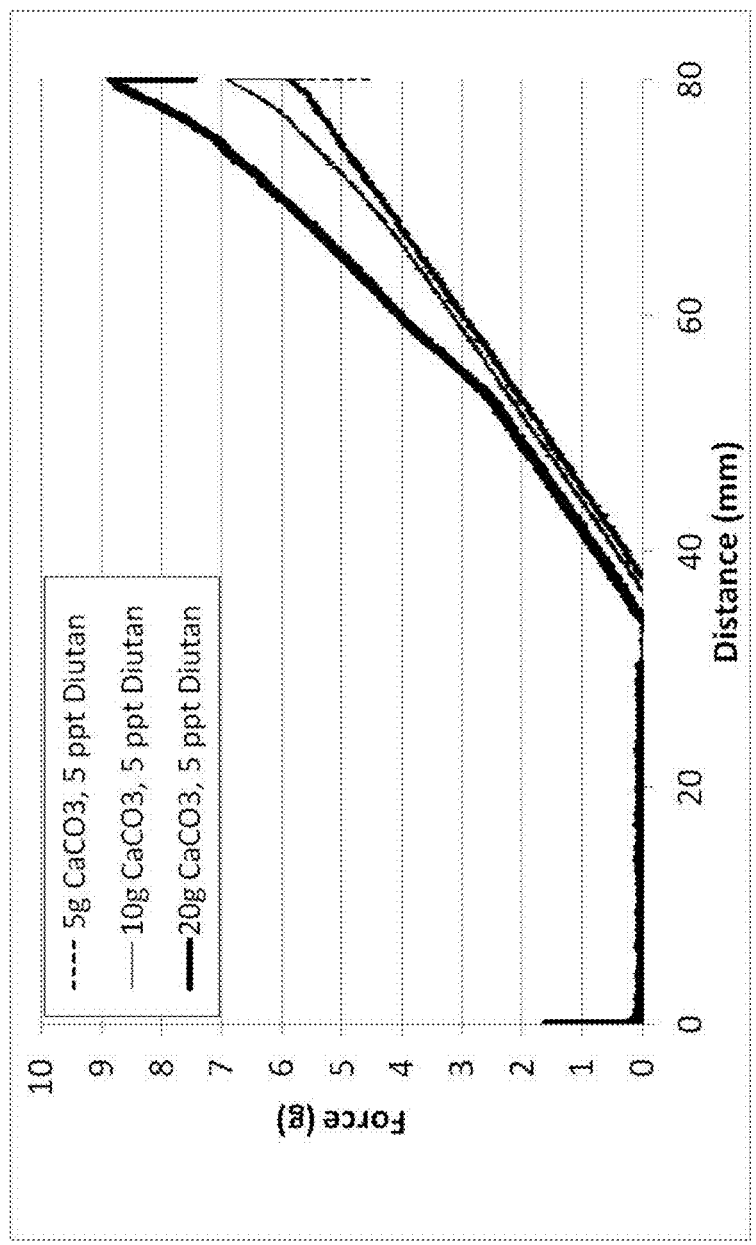
FIG. 2 illustrates the force recorded for a mixture of 100 g of 5 particles per thousand (ppt) of diutan polymer at various concentrations of calcium carbonate.
Figure 3:
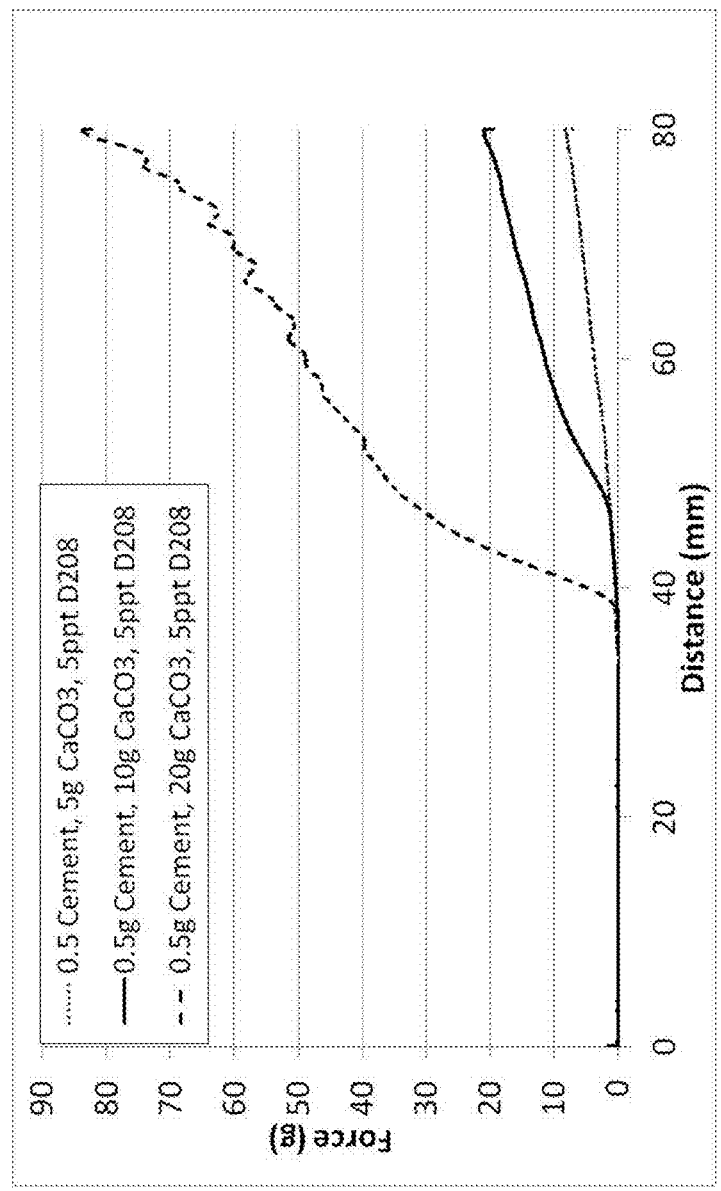
FIG. 3 shows the effect of adding cement and calcium carbonate to 100 g of 5 ppt of diutan solution.
Figure 4:
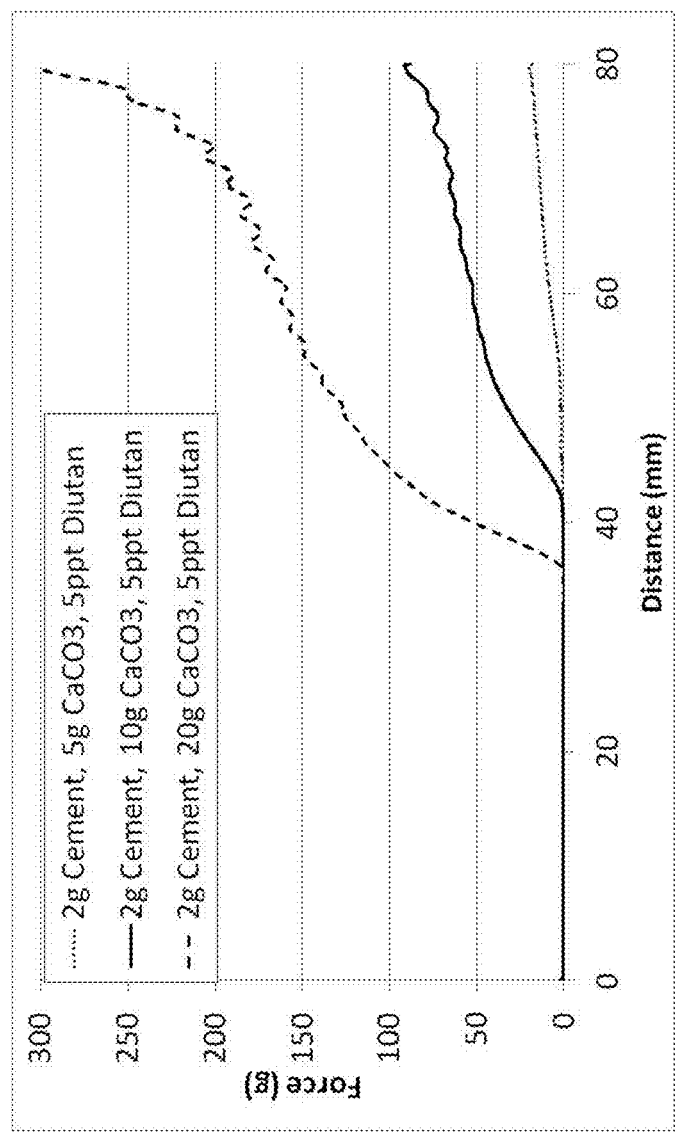
FIG. 4 shows the effect of adding higher concentration of cement to a calcium carbonate and 100 g of 5 ppt of diutan solution.

FIG. 2 show a graph of force recorded for a mixture of 100 g of 5 ppt Diutan polymer and various concentrations of CaCO3. This was the baseline data in the absence of cement. FIG. 3 shows the effect of adding 0.5 g of cement to varying concentrations of CaCO3 in a 100 g, 5 ppt Diutan polymer solution. The presence of cement increased the gel strength by almost 10 times at higher concentration of CaCO3. The strength of the gel may be increased by more than 30 times by increasing the amount of cement added to the mixture as shown in FIG. 4.

Example 4

Figure 5:
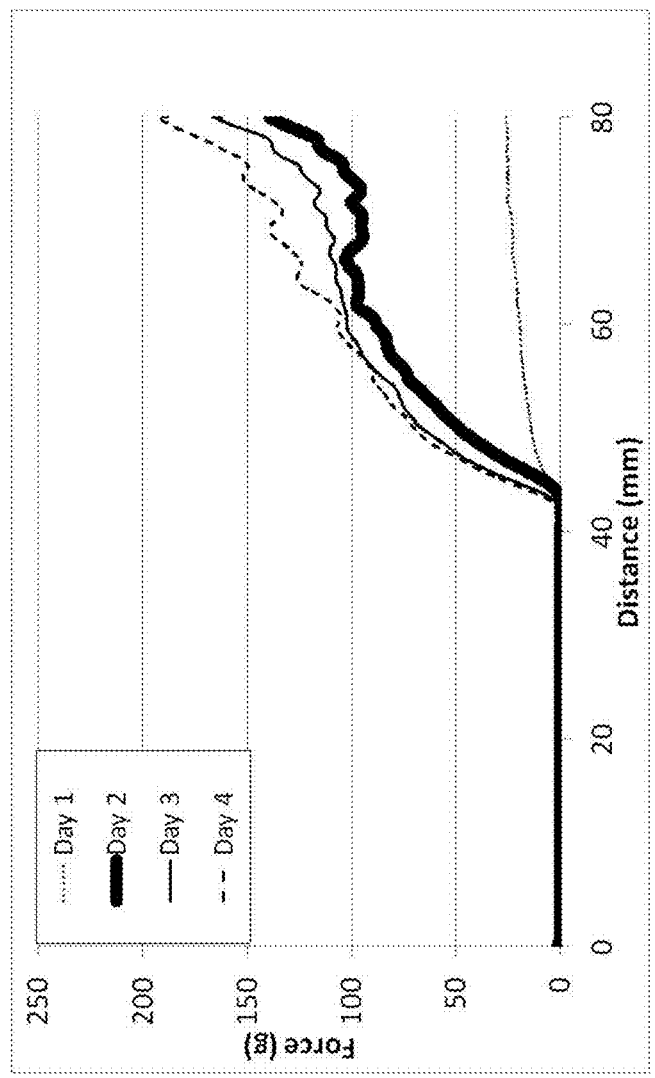
FIG. 5 shows the force measurement with time.

FIG. 5 shows that including cement in a mixture of polymer solution and calcium carbonate increases it gel strength with time. A more pronounced increased in gel strength was observed after one day and thereafter the increase was somewhat smaller. The kinetics of the gel strength development may therefore be tuned through varying cement, CaCO3 and polymer concentration.

Example 5

Figure 6:
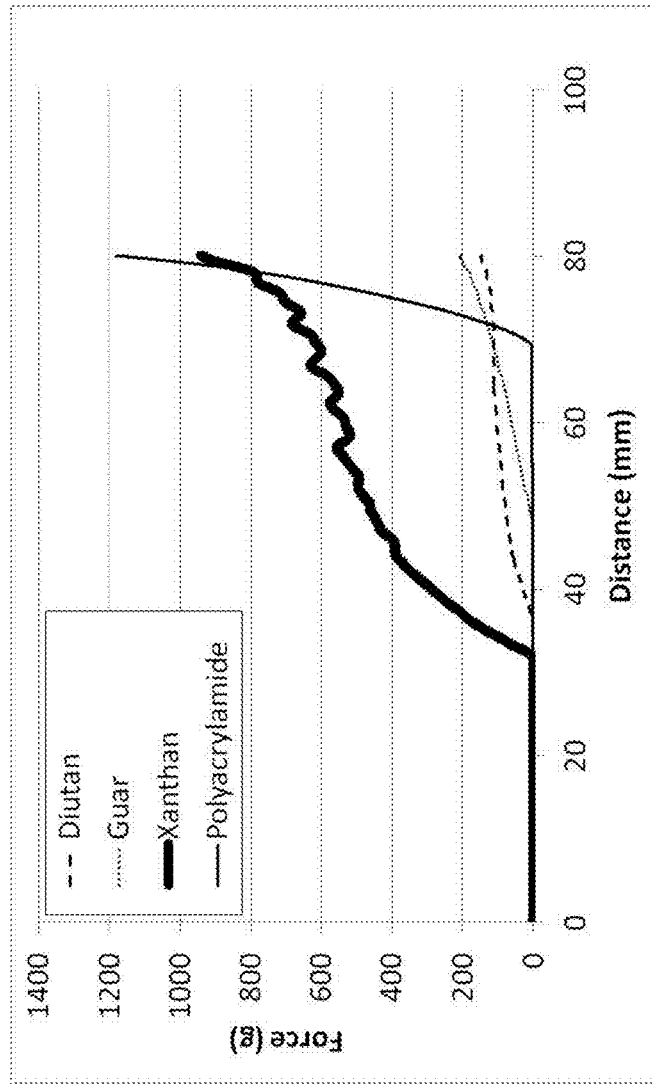
FIG. 6 illustrates the effects of varying the nature of the polymers.

The use of different polymers in conjunction with cement and calcium carbonate on the gel strength gave different magnitude of gel strength. The order of increasing gel strength was found to be Diutan<Guar<Xanthan<10% partially polyacrylamide as shown in FIG. 6. The polymer concentration was 10 ppt in water to which 20 g of $CaCO_3$ and 2 g of cement was added. The 10% partially polyacrylamide gave the strongest gel followed by Xanthan, Guar and Diutan.

The preceding description has been presented with reference to some embodiments. Persons skilled in the art and technology to which this disclosure pertains will appreciate that alterations and changes in the described structures and methods of operation can be practiced without meaningfully departing from the principle, and scope of this application. Accordingly, the foregoing description should not be read as pertaining only to the precise structures described and shown in the accompanying drawings, but rather should be read as consistent with and as support for the following claims, which are to have their fullest and fairest scope.

What is claimed is:

1. A method, comprising:
    adding from 0.1% to 10% by weight cement, and from 4% to 40% by weight of a source of calcium ions selected from the group consisting of calcium oxide, calcium hydroxide and calcium carbonate, to an aqueous treatment fluid containing a polymer, proppant and water, based on the weight of the resulting composition;
    increasing the viscosity of the aqueous treatment fluid.

2. The method of claim 1, wherein the polymer is a polysaccharide.

3. The method of claim 1, wherein the polymer is present in a concentration of from 0.02% to 1.5% by weight of the composition.

4. The method of claim 1, wherein the source of cement is a Portland cement, calcium aluminate cement or Sorel cement.

5. The method of claim 2, wherein the polysaccharide is selected from the group consisting of gellan gum, diutan gum, ramsan gum and derivatives thereof.

6. The method of claim 1, wherein the polymer is selected from the group consisting of guar gum, xanthan, polyacrylamide, karaya, gum tragacanth, gum ghatti, gum, acacia, gum konjak, hydroxyethyl guar, carboxymethyl hydroxypropyl guar, or carboxymethyl hydroxyl-ethyl guar and mixtures thereof.

7. The method of claim 1, further comprising:
    pumping the aqueous treatment fluid down a well to treat the well.

8. The method of claim 7, wherein the treatment is hydraulic fracturing.

9. The method of claim 7, wherein the treatment is a fluid separation.

10. The method of claim 7, wherein the viscosified treatment fluid comprises diutan, calcium carbonate, the cement and water.

11. The method of claim 10, wherein the cement is Portland cement.

* * * * *